United States Patent [19]
Candy et al.

[11] Patent Number: 5,812,055
[45] Date of Patent: Sep. 22, 1998

[54] MONITORING OF A SYSTEM

[75] Inventors: Richard Brodrick Charles Candy, Germiston; Anthony Vincent Blake, Alberton, both of South Africa

[73] Assignee: Eskom, Sandton, South Africa

[21] Appl. No.: 865,320

[22] Filed: May 29, 1997

[30] Foreign Application Priority Data

May 31, 1996 [ZA] South Africa .......................... 96/4490

[51] Int. Cl.$^6$ .................................................. G08B 25/00
[52] U.S. Cl. ........................ 340/525; 340/25.06; 364/146; 364/188
[58] Field of Search .................................... 364/146, 152, 364/188, 190, 141, 144; 349/825.06, 825.36

[56] References Cited

U.S. PATENT DOCUMENTS 5,400,246  3/1995  Wilson et al. ............................ 364/146

*Primary Examiner*—Jeffery A. Hofsass
*Assistant Examiner*—Daryl C. Pope
*Attorney, Agent, or Firm*—Rockey, Milnamow & Katz, Ltd.

[57] ABSTRACT

A method of monitoring a system, includes determining the values of a number of parameters of equipment comprising the system. The values when the parameters become abnormal and when they become normal are determined. Those parameters that become abnormal and those parameters which were abnormal and become normal and the times at which these events occurred are recorded. The parameters are grouped in a plurality of different categories. The number of abnormal parameters in each category in a predetermined time interval is summarized. The number of abnormal parameters in each category in each time interval is displayed for a predetermined time window. The invention also extends to an arrangement for monitoring a system.

23 Claims, 5 Drawing Sheets

MONITORING OF A SYSTEM

BACKGROUND OF INVENTION

This invention relates to the monitoring of a system. More particularly, it relates to a method of and an arrangement for monitoring a system. The system may be any type and may, for example, be an electric utility, a ship or craft, a chemical plant, or an amusement park.

SUMMARY OF INVENTION

Such systems have supervisory control and data acquisition arrangements which monitor the amplitude, state or condition of various parameters of equipment and components thereof and display alarm conditions on a display, to be acted on by control staff.

In this specification, the amplitude, condition or state of a parameter will be referred to as the "value" of the parameter.

A parameter is regarded as "abnormal" if its value attains an amplitude greater than or less than a predetermined amount or if its condition or state changes in an undesired way. Correspondingly, a parameter is regarded as "normal" if it has an amplitude less than or greater than the said predetermined amount (as the case may be) or if its condition or state is acceptable.

According to the invention there is provided a method of monitoring a system, which includes determining the values of a number of parameters of equipment comprising the system;

determining from the values when the parameters become abnormal and when they become normal;

recording those parameters that become abnormal and those parameters which were abnormal and become normal and the times at which these events occurred;

grouping the parameters in a plurality of different categories;

summarising the number of abnormal parameters in each category in a predetermined time interval; and displaying, for a predetermined time window, the number of abnormal parameters in each category in each time interval.

The method may further include displaying the number of parameters in each category which become abnormal during the time interval in question.

The number of abnormal parameters in each category in a time interval may be represented by the length of a line. The line may be displayed against a linear measuring scale so that the number of abnormal parameters represented by the line can be determined.

The method may also include displaying the abnormal parameters in a chronological sequence. The method may further include arranging the abnormal parameters in a vertical display, as a list, in a panel such that the latest events are displayed at the top of the list and the earlier events serially below.

The time window and the time interval being displayed may be manually controlled by means of a pointing device and control icons. The method may further include recording the parameters, their values and the times at which the parameters change from normal to abnormal and vice versa, in a database.

Further according to the invention there is provided an arrangement for monitoring a system, which includes a value determining means for determining the values of a number of parameters of equipment comprising the system;

a change determining means for determining from the values when the parameters become abnormal and when they become normal;

a recording means for recording those parameters that become abnormal and those parameters which were abnormal and become normal and the times at which these events occurred;

a grouping means for grouping the parameters in a plurality of different categories;

a summarising means for summarizing the number of abnormal parameters in each category in a predetermined time interval; and a display means for displaying, in a display for a predetermined time window, the number of abnormal parameters in each category in each time interval.

The display may include the number of parameters in each category which become abnormal during the time interval in question.

The number of abnormal parameters in each category in a time interval may be represented by the length of a line in the display. The line may be displayed against a linear measuring scale so that the number of abnormal parameters represented by the line can be determined. Each line may have a maximum predetermined length, such that the line of maximum length is displayed if the said maximum or a greater number of abnormal parameters occur.

Each category may be represented by a line of a different colour.

The display may be chronologically arranged, with the latest events being displayed first and the preceding events following in a chronological sequence.

Conveniently, the display may be arranged in a vertical manner, as a list, in a panel such that the latest events are displayed at the top of the list and the preceding events serially below.

The display may be updated after a predetermined time period, so that the latest event of the next time period will be displayed at the top of the list and the other events are scrolled down, with the preceding events "falling off" at the bottom of the list.

The list may be displayed in real time, with the actual time being optionally displayed.

Instead, the display may be of events which occurred previously, in a "play-back" mode.

The arrangement may be interactive. Thus, the display may be responsive to a pointing device and control icons whereby a user controls what is being displayed.

The time interval and the time window may be user determined by means of the pointing device and control icons, within predetermined ranges. In particular, there may be icons for a "real time" or "play-back" modes.

In addition, if more information is required about the abnormal parameters in a particular time interval, then details of these may be displayed if the line in question is designated and activated by means of the pointing device.

The arrangement may have one or more central processing units. Thus, the change determining means, the recording means, the grouping means and the summarising means may be implemented in a software manner. In addition, the recording means may record the parameters, their values and the times at which the parameters change from normal to abnormal and vice versa in a database.

The invention is now described, by way of an example, with reference to the accompanying drawings, in which:

DETAILED DESCRIPTION OF THE DRAWINGS

Figure 1:
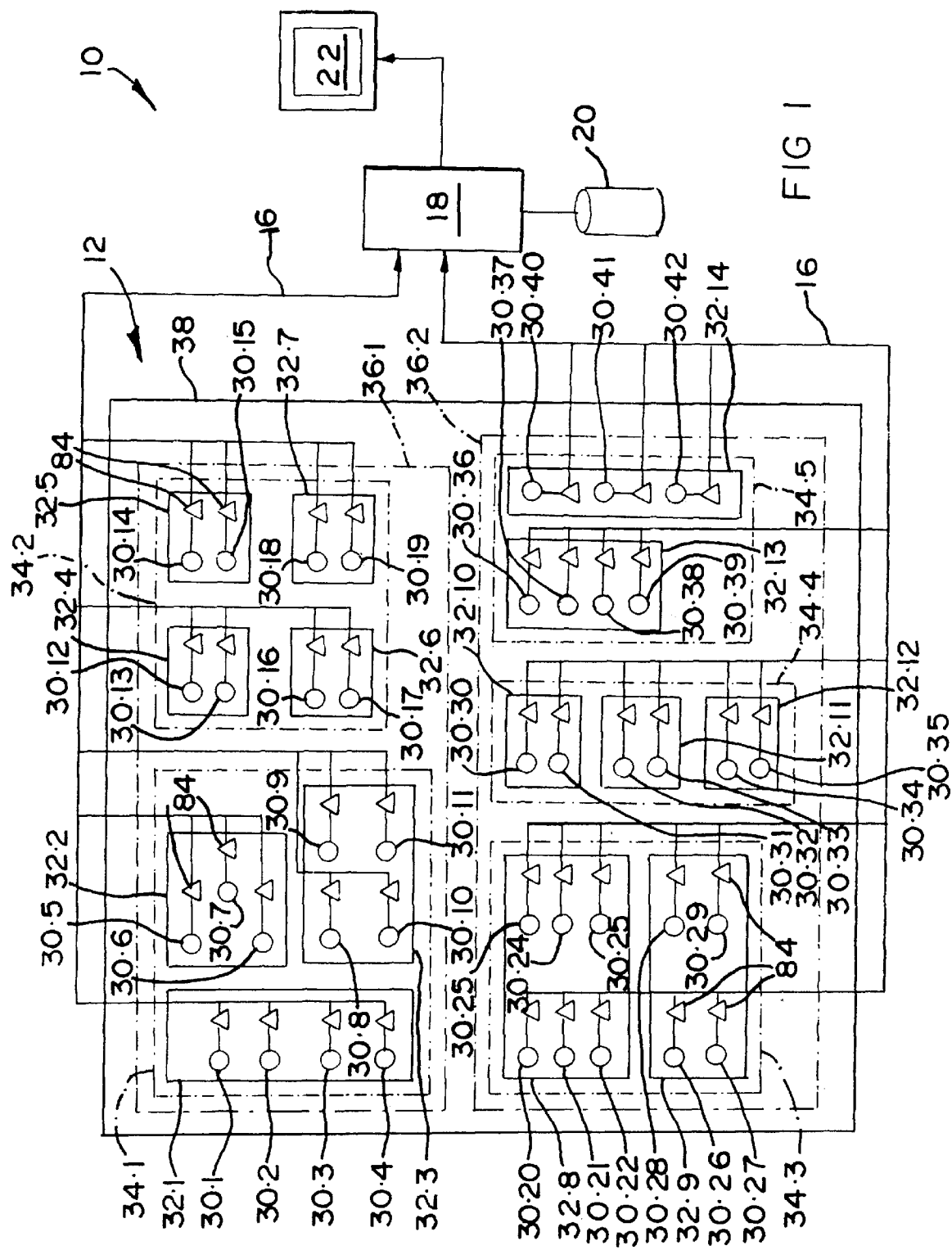
FIG. 1 shows schematically, an electric utility with a monitoring arrangement in accordance with the invention, for monitoring the operation thereof.

Referring further to FIG. 1, a monitoring arrangement according to the invention is designated generally by reference numeral 10. The arrangement 10 monitors the operation of a system 12 which is an electric utility. The utility comprises a network 38 which is divided into regions 36.1 and 36.2. The region 36.1 has stations 34.1 and 34.2 and the region 36.2 has stations 34.3, 34.4 and 34.5. The station 34.1 has objects 32.1, 32.2, and 32.3; the station 34.2 has objects 32.4, 32.5, 32.6 and 32.7; the station 34.3 has objects 32.8 and 32.9; the station 34.4 has objects 32.10, 32.11 and 32.12) and the station 34.5 has objects 32.13 and 32.14. The object 32.1, in turn, is made up of devices 30.1, 30.2, 30.3 and 30.4; the object 32.2 is made up of devices 30.5, 30.6 and 30.7; the object 32.3 is made up of devices 30.8, 30.9, 30.10 and 30.11; the object 32.4 is made up of devices 30.12 and 30.13; the object 32.5 is made up of devices 30.14 and 30.15; the object 32.6 is made up of devices 30.15, 30.16 and 30.17; the object 32.7 is made up of devices 30.18 and 30.19; the object 32.8 is made up of devices 30.20, 30.21, 30.22, 30.23, 30.24 and 30.25; the object 32.9 is made up of devices 30.26, 30.27, 30.28 and 30.29; the object 32.10 is made up of devices 30.30 and 30.31; the object 32.11 is made up of devices 30.32 and 30.33; the object 32.12 is made up of devices 30.34 and 30.35; the object 3.2.13 is made up of devices 30.36, 30.37, 30.38 and 30.39; and the object 32.14 is made up of devices 30.40, 30.41 and 30.42.

Each device 30.1 to 30.42 is monitored by its own monitor 14, in a known manner. The monitors 14 monitor various parameters of the devices 30 and supply appropriate signals, again in known manner, via a transmission means 16, to a central computer 18. This computer 18 processes the signals that it receives and determines when any signal attains an abnormal value. If any parameter for any device 30 does acquire an abnormal value, the parameter, its value, the device and the time are stored in a memory unit 20 to create a database. Further, the various parameters are divided into different categories, being health, main protection, backup protection and information. The number of parameters in each category for each device that acquire an abnormal value are summed and also stored in the memory unit 20.

The various categories are upwardly summed, as explained below, for each category, for each object 32, each station 34, each region 36 and the network 38 as a whole; and stored in the memory unit 20. Still further, as explained below, the computer 18 generates and supplies appropriate signals to a display unit 22 which provides a display 60 such as that shown in FIGS. 4 and 5.

In order to explain the pyramidal structure further, the grouping of an electric utility is explained as follows:

At the lowest level are the individual devices 30 that form the system, such as breakers, transformers and isolators.

When the devices 30 are grouped together they form the electrical objects 32 such as feeder bays, busbars, reactor bays, capacitor bays, transformer bays, etc.

Grouping the objects 32 together creates the substations or power generating stations 34.

Grouping the stations 34 together forms the region 36 of the network 38.

Grouping the regions 36 together forms the network 38.

In regard to the categories, as indicated above, they relate to the health of the devices 30, main protection, backup protection and information. Thus, any parameter which indicates that a condition exists on or associated with the device 30 that could prevent it being reinstated safely is classed in the health category. A parameter which is associated with primary protection and which indicates that primary protection has activated is classed in the main protection category. A parameter associated with secondary protection is classed in the backup protection category. Any other non-operation-critical information is classed in the information category.

The number of abnormal conditions may be upwardly summed.

Figure 2:
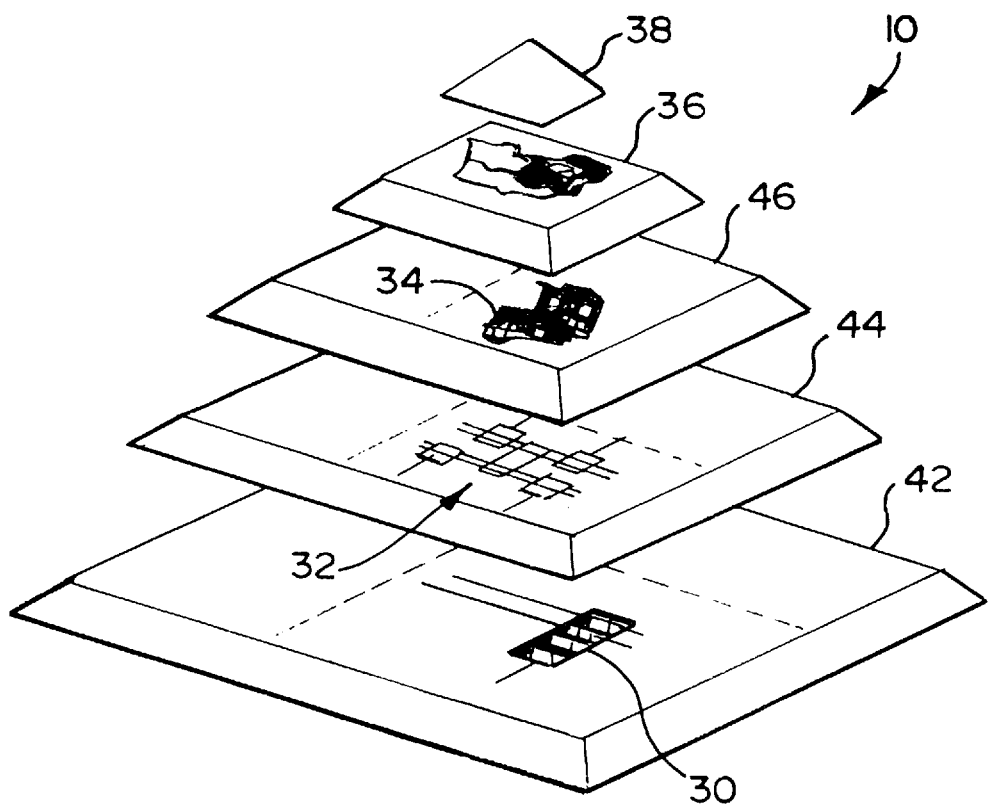
FIG. 2 shows schematically the pyramidal structure of the electric utility.

Referring now to FIG. 2, the pyramidal structure of the electric utility is shown. The structure denotes the utility in a notional representative form. It will be seen that the structure has five levels. A bottom-most, device level 42 represents the individual devices 30 which make up the electric utility. The second level 44 is representative of the electrical objects 32. The next level 46 represents the stations 34. Grouping the stations 34 together provides the regions 36. Finally, the upper-most level is the network 38.

As indicated above, various parameters associated with each device (and which vary from one device type to another) are monitored. Also, as indicated above, the parameters are divided into four categories—Health, Main protection, Backup protection and Information. Various parameters for various devices, and the category in which they are allocated are as follows:

1. GENERATOR
HEALTH CATEGORY

| | |
|---|---|
| General alarm | Alarm/normal |
| Emergency shutdown | Progress/inactive |
| Generator start | Not ready/idle |
| Synchronised start | Not ready/idle |

INFORMATION CATEGORY

| | |
|---|---|
| Emergecy trip | |
| Remote control | On/off |
| Sequence start | Auto/remote |
| Shutdown | Yes/no |
| Status | Start/normal |
| Guide vane mode | Auto/manual |

2. TRANSFORMER
HEALTH

| | |
|---|---|
| SF6 non-urgent | Alarm/normal |
| SF6 urgent | Alarm/normal |
| Scald supervisory | Alarm/normal |
| DC supervision | Alarm/normal |
| Fire | Alarm/normal |
| Bus zone DC | Fail/normal |

MAIN

| | |
|---|---|
| Bus strip | Operated/normal |
| Bus zone | Operated/normal |
| Auto U/F control | Failed/normal |

-continued

| INFORMATION | |
|---|---|
| Maximum generation | Selected/off |
| Emergency generation | Selected/off |
| Maximum Generation | Reset/initiated |
| Emergency generation | Reset/initiated |
| 3. A DAM | |
| HEALTH | |
| Low water level | Trip/normal |
| BACKUP | |
| Supply dam #1 level | Trip/normal |
| Supply dam #2 level | Trip/normal |
| INFORMATION | |
| High water | Trip/normal |

The manner in which the parameters are monitored are well known to persons skilled in the control of electric utilities and do not form any part of this invention.

Figure 3:
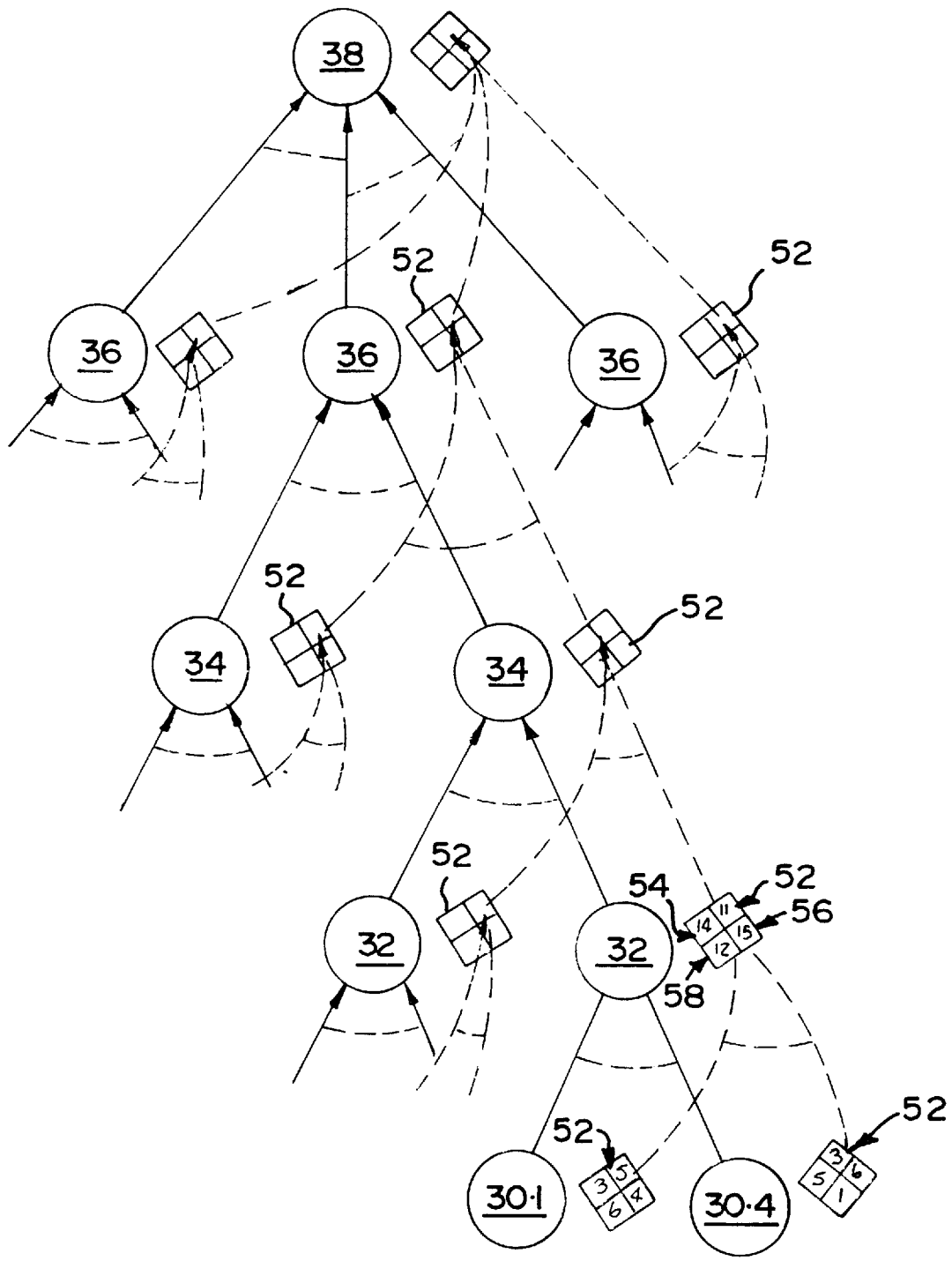
FIG. 3 shows schematically an upward summing procedure utilised with the structure.

The manner in which the parameters are upwardly summed is illustrated in FIG. 3 using "diamond-shaped" icons 52 to indicate each category. Thus, the parameters for all the devices 30 in the system are monitored and when any parameter attains an abnormal value the number for the category in question is increased by one. Similarly, if a particular parameter had an abnormal value which then reverted to a normal value, then the number in the category in question for the device in question is decreased by one.

As indicated above, there are a number of objects 32 in the object level. Each object 32 is made up of one or more of the devices 30. The number of abnormal parameters in each category for each device 30 associated with a particular object are summed to provide a number for the category in question for the object 32 in question. Thus, for example, if a particular object 32 is made up of four devices 30.1, 30.2, 30.3 and 30.4 and these devices have the following numbers of abnormal parameters in the four categories:

| | Number of abnormal parameters in health category | Number of abnormal parameters in main protection category | Number of abnormal parameters in backup protection category | Number of abnormal parameters in information category |
|---|---|---|---|---|
| Device 30.1 | 5 | 3 | 4 | 6 |
| Device 30.2 | 2 | 4 | 5 | 2 |
| Device 30.3 | 1 | 2 | 0 | 3 |
| Device 30.4 | 3 | 5 | 6 | 1 |
| Total for object 32 | 11 | 14 | 15 | 12 |

Thus, at the object level, the object 32 will have icons 52, 54, 56 and 58 for each category with the numbers "11", "14", "15" and "12" respectively, therein.

Similarly, at the station level there are a number of stations 34, each station being formed from one or more of the objects 32 in the object level. Again, the number of abnormal parameters in each category for each object 32 forming a particular station 34 are summed to provide the number of abnormal parameters in each category for that station.

This process is repeated further upwardly to provide the number of abnormal parameters in each category for each region 36 at the region level and then for the network 38 itself, at the very top of the pyramidal structure.

Figure 4:
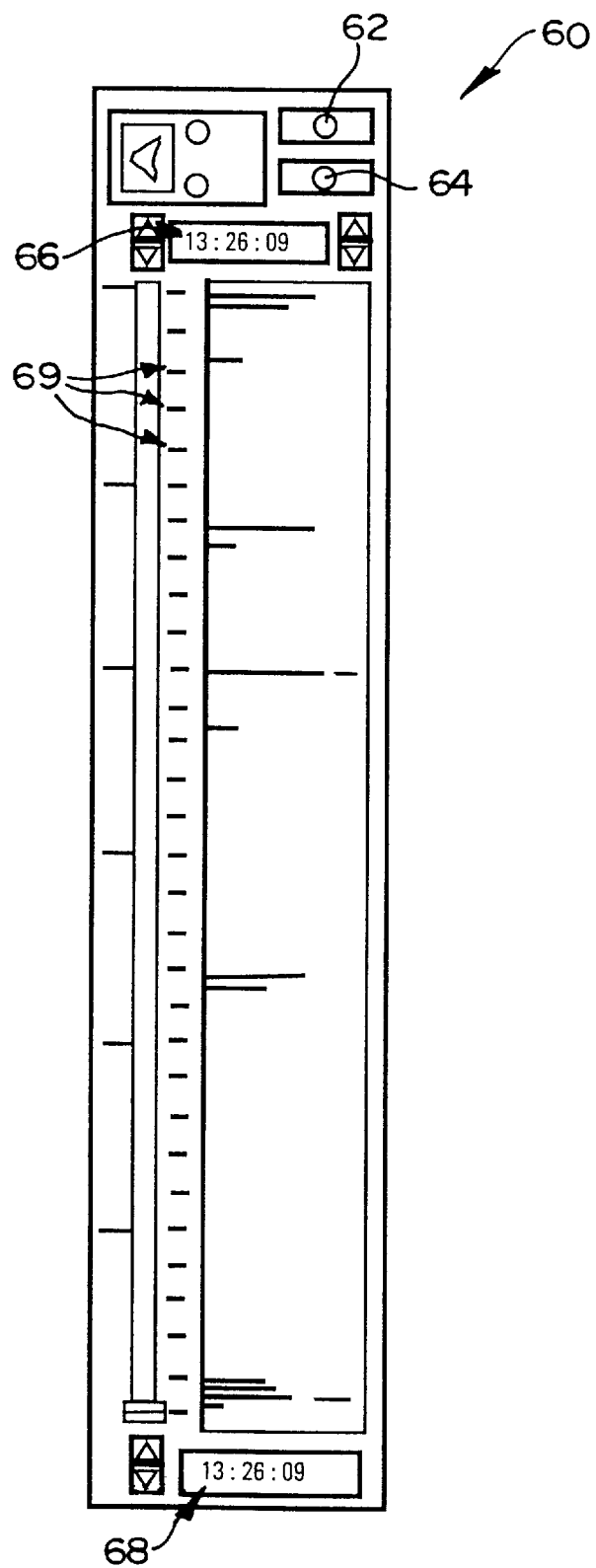
FIG. 4 shows a display that is provided by the arrangement.
Figure 5:
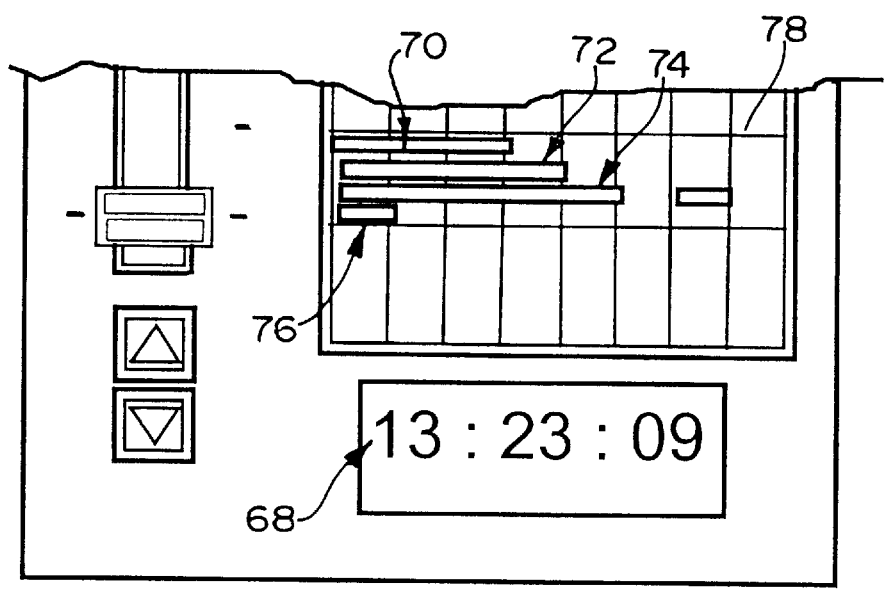
FIG. 5 shows a portion of the display in more detail.

Referring now to FIGS. 4 and 5, a time line display 60 of a selected part of the network 38 is shown. The display could be for the network 38 itself, a region 36, a station 34, or an object 32. The display 60 has "buttons" 62 and 64 which indicate if the display 60 is in real time or a play back of events at an earlier time. The buttons 62 and 64 are also used, together with a pointing device (not shown) to select the mode desired.

As indicated, the time is displayed at 66. This will either be the real time (in real time mode), or the time at which the events occurred (in play back mode). The display 60 encompasses a predetermined time window, which could, for example, be 3 minutes or 30 minutes. Depending on the selected extent of the time window, the time at the end of the window is shown at 68. In the example, the time window is 3 minutes, so the time indicated at 68 is 3 minutes earlier than the time indicated at 66.

The window is divided into 30 time intervals 69, each of 6 seconds. The number of parameters in each category that become abnormal in each time interval is indicated by means of a line at the appropriate position in the display 60. The different categories are indicated by different colours. Thus, as shown in FIG. 5, the main protection category is designated by a cyan line 70; the back-up protection category by a green line 72; the health category by a yellow line 74; and the information category by a magenta line 76. As indicated above, the length of each line 70 to 76, at each time position, indicates the number of parameters that became abnormal in the time interval in question. The display 60 has a background grid 78 to facilitate perception of the length of each line 70 to 76. Thus, in FIG. 5, the main protection line 70 has a length of "3", indicating that three main protection parameters became abnormal in the time interval; the back-up protection line 72 has a length of "4", indicating that four back-up protection parameters became abnormal in the time interval; the health line 74 is in two parts—a first part that has a length of "5" and a second spaced part with a length of "1", to indicate that more than five health parameters became abnormal in the time interval; and the information line has a length of "1" to indicate that one information parameter became abnormal in the time interval in question.

The lines in the display 60 are shifted down every 6 seconds (in the particular example being discussed), with new lines being displayed at the top of the display 60 and the earliest "falling off" the bottom of the display.

It will accordingly be appreciated that the state at each level at any time is indicated by the length of the lines in the display and a control operator can easily and quickly monitor and understand the condition or state of the utility network or any particular component thereof.

As indicated above, the display is interactive by means of the pointing device. Thus, if the pointing device is directed at any particular line, and activated, then the parameters in that category that are abnormal, their values, and the time at which they occurred are displayed in a panel forming part of the display (not shown).

An operator then monitors the system, again in known manner, with reference to the display 60 provided on the display unit 22.

We claim:

1. A method of monitoring a system, which includes determining the values of a number of parameters of equipment comprising the system;

determining from the values when the parameters become abnormal and when they become normal;

recording those parameters that become abnormal and those parameters which were abnormal and become normal and the times at which these events occurred;

grouping the parameters in a plurality of different categories in accordance with the nature of the parameters;

determining the number of abnormal parameters in each category in a plurality of predetermined time intervals for each of the time intervals; and displaying, for a predetermined time window which incorporates said plurality of time intervals, the number of abnormal parameters in each category in each time interval.

2. The method as claimed in claim 1, which includes displaying the number of parameters in each category which become abnormal during the time interval in question.

3. The method as claimed in claim 1, wherein the number of abnormal parameters in each category in a time interval is represented by the length of a line.

4. The method as claimed in claim 3, which includes displaying the line against a linear measuring scale so that the number of abnormal parameters represented by the line can be determined.

5. The method as claimed in claim 1, which includes displaying the abnormal parameters in a chronological sequence.

6. The method as claimed in claim 5 which includes arranging the abnormal parameters in a vertical display, as a list, in a panel such that the latest events are displayed at the top of the list and the earlier events serially below.

7. The method as claimed in claim 6 which includes manually controlling the time window and the time interval being displayed by means of a pointing device and control icons.

8. The method as claimed in claim 1, which includes recording the parameters, their values and times at which the parameters change from normal to abnormal and vice versa, in a database.

9. An arrangement for monitoring a system, which includes a value determining means for determining the values of a number of parameters of equipment comprising the system;

a change determining means for determining from the values when the parameters become abnormal and when they become normal;

a recording means for recording those parameters that become abnormal and those parameters which were abnormal and become normal and the times at which these events occurred;

a grouping means for grouping the parameters in a plurality of different categories in accordance with the nature of the parameters;

a number determining means for determining the number of abnormal parameters in each category in a plurality of predetermined time intervals for each of the time intervals; and a display means for displaying, for a predetermined time window which incorporates said plurality of time intervals, the number of abnormal parameters in each category in each time interval.

10. The arrangement as claimed in claim 9, wherein the display means also displays, in use, the number of parameters in each category which becomes abnormal during the time interval in question.

11. The arrangement as claimed in claim 9, wherein the number of abnormal parameters in each category in a time interval is represented by the length of a line.

12. The arrangement as claimed in claim 11, wherein the line is displayed against a linear measuring scale so that the number of abnormal parameters represented by the line can be determined.

13. The arrangement as claimed in claim 11 wherein each category is represented by a line of a different colour.

14. The arrangement as claimed in claim 9, wherein the display is chronologically arranged, with the latest events being displayed first and the preceding events following in a chronological sequence.

15. The arrangement as claimed in claim 14, wherein the display is arranged in a vertical manner, as a list, in a panel such that the latest events are displayed at the top of the list and the preceding events serially below.

16. The arrangement as claimed in claim 15, wherein the display is updated after a predetermined time period, so that the latest events of the next time period will be displayed at the top of the list and the other events are scrolled down, with the preceding events "falling off" at the bottom of the list.

17. The arrangement as claimed in claim 16, wherein the list is displayed in real time, with the actual time being optionally displayed.

18. The arrangement as claimed in claim 17, wherein the display is of events which occurred previously, in a "playback" mode.

19. The arrangement as claimed in claim 9, wherein the display is responsive to a pointing device and control icons whereby a user controls what is being displayed.

20. The arrangement as claimed in claim 19, wherein the time interval and the time window are user determined by means of the pointing device and control icons, within predetermined ranges.

21. The arrangement as claimed in claim 20 wherein, if more information is required about the abnormal parameters in a particular time interval, then details of these are displayed if the line in question is designated and activated by means of the pointing device.

22. The arrangement as claimed in claim 9, which includes one or more central processing units, with the change determining means, the recording means, the grouping means and the summarising means being implemented in a software manner.

23. The arrangement as claimed in claim 9, wherein the recording means records the parameters, their values and the times at which the parameters change from normal to abnormal and vice versa, in a database.

* * * * *